US008903990B2

(12) United States Patent
Kubinszky et al.

(10) Patent No.: US 8,903,990 B2
(45) Date of Patent: Dec. 2, 2014

(54) IMS PERFORMANCE MONITORING (75) Inventors: Ferenc Kubinszky, Szentendre (HU); Péter Benkö, Budapest (HU); Peter Vaderna, Budapest (HU); Tamas Borsos, Budapest (HU); Andras Veres, Budapest (HU); Szabolcs Malomsoky, Szentendre (HU); Zsolt Kenesi, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 800 days.

(21) Appl. No.: 12/996,439

(22) PCT Filed: Jun. 6, 2008

(86) PCT No.: PCT/IB2008/001464
§ 371 (c)(1),
(2), (4) Date: Dec. 6, 2010

(87) PCT Pub. No.: WO2009/147466
PCT Pub. Date: Dec. 10, 2009

(65) Prior Publication Data
US 2011/0093592 A1    Apr. 21, 2011

(51) Int. Cl.
G06F 15/173    (2006.01)
H04L 12/24    (2006.01)
H04L 29/06    (2006.01)

(52) U.S. Cl.
CPC ......... H04L 41/0677 (2013.01); H04L 65/1006 (2013.01); H04L 65/1016 (2013.01)
USPC ............................. 709/224; 709/221; 709/223

(58) Field of Classification Search
None
See application file for complete search history.

(56) References Cited

U.S. PATENT DOCUMENTS 3,790,717 A * 2/1974 Abramson et al. ............ 370/431
6,836,840 B2 * 12/2004 Lo et al. .......................... 712/31
7,649,840 B2 * 1/2010 Kalland et al. ............. 370/230.1

(Continued)

FOREIGN PATENT DOCUMENTS

CN          101110719 A    1/2008
WO     WO 2007/004938    1/2007

OTHER PUBLICATIONS

English translation of Second Chinese Office Action mailed Nov. 22, 2013 in corresponding Chinese Patent Application No. 200880129677.8 (7 pages).

(Continued)

*Primary Examiner* — Mohamed Ibrahim
(74) *Attorney, Agent, or Firm* — Nixon & Vanderhye, P.C.

(57) ABSTRACT

A method and apparatus enabling performance monitoring in packet-switched IP networks such as those configured according to an IP multimedia subsystem, IMS, architecture. Performance is monitored by reconstructing selected control signaling sequences. The control signaling sequences, which are typically executed according a signaling protocol such as the Session Initiation Protocol, SIP, are reconstructed by parsing the contents of monitoring request headers configured, modified, and attached to control messages according to the present invention. The header includes at least an IMS monitoring ID field (510) for identifying the signaling sequence to be reconstructed, a processing node ID field (520) for representing the entities processing the messages, and a requester ID field (530) for identifying a requesting entity. It may also specify a monitoring level (540) indicative of the monitoring tasks required. The monitoring may be requested by an IMS node, or by an entity outside the IMS.

28 Claims, 9 Drawing Sheets

(56) References Cited

U.S. PATENT DOCUMENTS

| | | | |
|---|---|---|---|
| 7,738,448 B2* | 6/2010 | Renschler | 370/356 |
| 7,822,065 B2* | 10/2010 | Lu | 370/469 |
| 2002/0034479 A1* | 3/2002 | Green | 424/52 |
| 2002/0064164 A1* | 5/2002 | Barany et al. | 370/401 |
| 2004/0153497 A1* | 8/2004 | Van Dyke et al. | 709/201 |
| 2006/0153160 A1 | 7/2006 | Kalland et al. | |
| 2006/0250988 A1* | 11/2006 | Garcia et al. | 370/260 |
| 2007/0094142 A1* | 4/2007 | Russell et al. | 705/52 |
| 2007/0280447 A1* | 12/2007 | Cai et al. | 379/114.03 |
| 2008/0192730 A1* | 8/2008 | Cai et al. | 370/352 |

OTHER PUBLICATIONS

English Translation of First Office Action issued on Jan. 23, 2013 in Chinese application No. 200880129677.8 (p. 1-6).

\* cited by examiner

IMS PERFORMANCE MONITORING

This application is the U.S. national phase of International Application No. PCT/IB2008/001464 filed 6 Jun. 2008 which designated the U.S., the entire contents of which is hereby incorporated by reference.

TECHNICAL FIELD

The present invention is directed, in general to packet-switched network communications and, more specifically, to a manner of monitoring performance and fault localization through signaling-sequence reconstruction in such networks, such as for SIP (session initiation protocol) control signaling sequences in IMS (IP multimedia subsystem) networks.

BACKGROUND

The technology empowering large-scale mobile network communications has improved dramatically in recent years. Users of mobile stations may now not only make standard telephone calls via a cellular network, but may access a wide variety of voice and data services including email applications and the downloading of audio, video, and multimedia presentations. Many of these services are delivered using a packet-switching IP (Internet protocol) network that is connected to the cellular network via a gateway. Other types of mobile devices, such as laptop computers, may also access these services via, for example, a WLAN (wireless local area network). Given the multiplication of available applications, new network architectures have been developed to facilitate delivery of these services.

Many communication network components are configured and operated according to standard protocols that are being developed and promulgated by standard-setting bodies having a diverse membership. On such group is the 3GPP (3$^{rd}$ Generation Partnership Project). 3GPP, for example, has promulgated standards for a new network architecture known as IMS (IP Multimedia Subsystem). IMS is an architectural framework for delivering multimedia content for mobile users. This architectural framework is directed to session and connection control services as well as application services. It is an effort to collectively define all IP-based wireless services such as voice and data as well as signaling and control. A brief overview of an IMS network follows.

Figure 1:
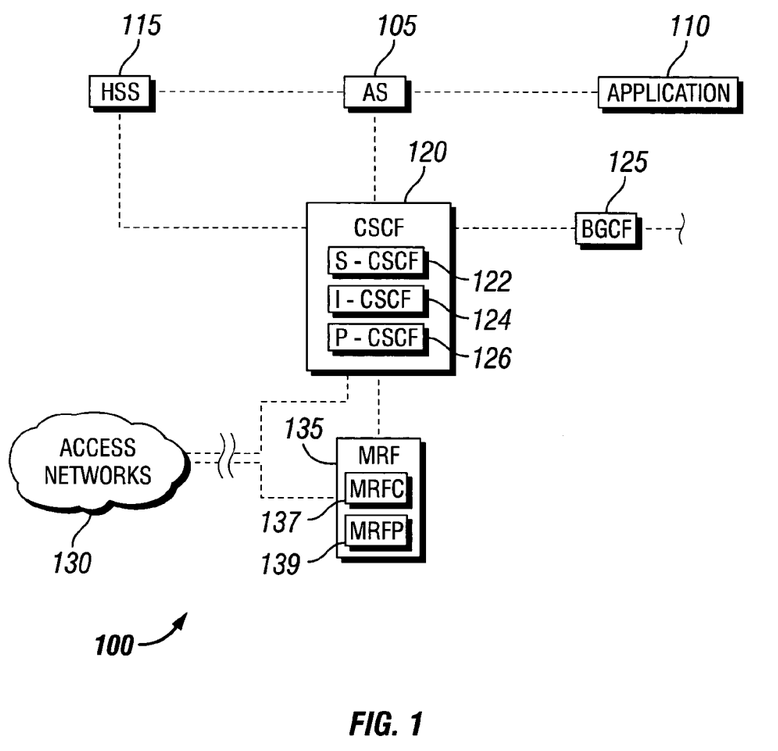
FIG. 1 is a simplified block diagram illustrating the selected components of an IMS (IP multimedia subsystem) in which embodiments of the present invention may be advantageously implemented.

FIG. 1 is a simplified block diagram illustrating a network 100 including selected components related to operation of an IMS, in which embodiments of the present invention may be advantageously implemented. Network 100 includes an AS (application server) 105 connected to application 110 and HSS (home subscriber server) 105. Application servers provide services related to IMS communications and interface with the applications 110 themselves. Note that although this depiction of the IMS architecture shows a single AS and application, in reality of course there are many such devices in the communication network. The HSS 115, typically associated with a mobile user's home network, maintains information useful to the IMS such as subscriber profiles and current location. These components are considered to be part of the application and services layer of the IMS architecture.

The application and services layer interfaces with an IMS layer using SIP (session initiation protocol) control signaling. Specifically, the AS 105 and the HSS 115 communicate with the CSCF (call session control function) 120 to perform such functions as setting up and terminating communication sessions. CSCF 120 is part of the IMS layer, and is actually representative of the P-CSCF (proxy-CSCF) 122, the ICSCF (interrogating-CSCF) 124, and the S-CSCF (serving-CSCF) 126. Generally speaking, the S-CSCF 122 interfaces directly with the AS 105, while the P-CSCF 126, which may be in a user's home network or in a visited network, is the proxy server that initially directs user call toward their target destination. Also shown in the IMS layer of FIG. 1 is a BGCF (breakout gateway control function) 125, which allows the IMS to communicate with circuit switched networks (not shown).

The access layer of an IMS network enables mobile users to access the services offered via the IMS. In FIG. 1 the access layer is represented by access networks 130, which include for example the cellular networks and WLANs referred to above. Access networks 130 typically interface with the CSCF 120 via a packet-switching IP network (not shown). Representing the transport layer in the simplified block diagram of FIG. 1 is MRF (media resource function) 135, which comprises MRFC (media resource function controller) 137 and MRFP (media resource function processor) 139. MRFC 137 interfaces with the CSCF 120 and controls the operation of MRFP 139. MRFP 139 handles, for example, the manipulation of streaming audio and video multimedia presentations.

As mentioned above, FIG. 1 is a simplified block diagram depicting generally the relationships and function of selected IMS components. The present invention relates to the signaling, and in most implementations specifically the SIP control signaling that takes place between IMS entities such as those shown in FIG. 1. An overview of that signaling process will now be described as well.

Figure 2:
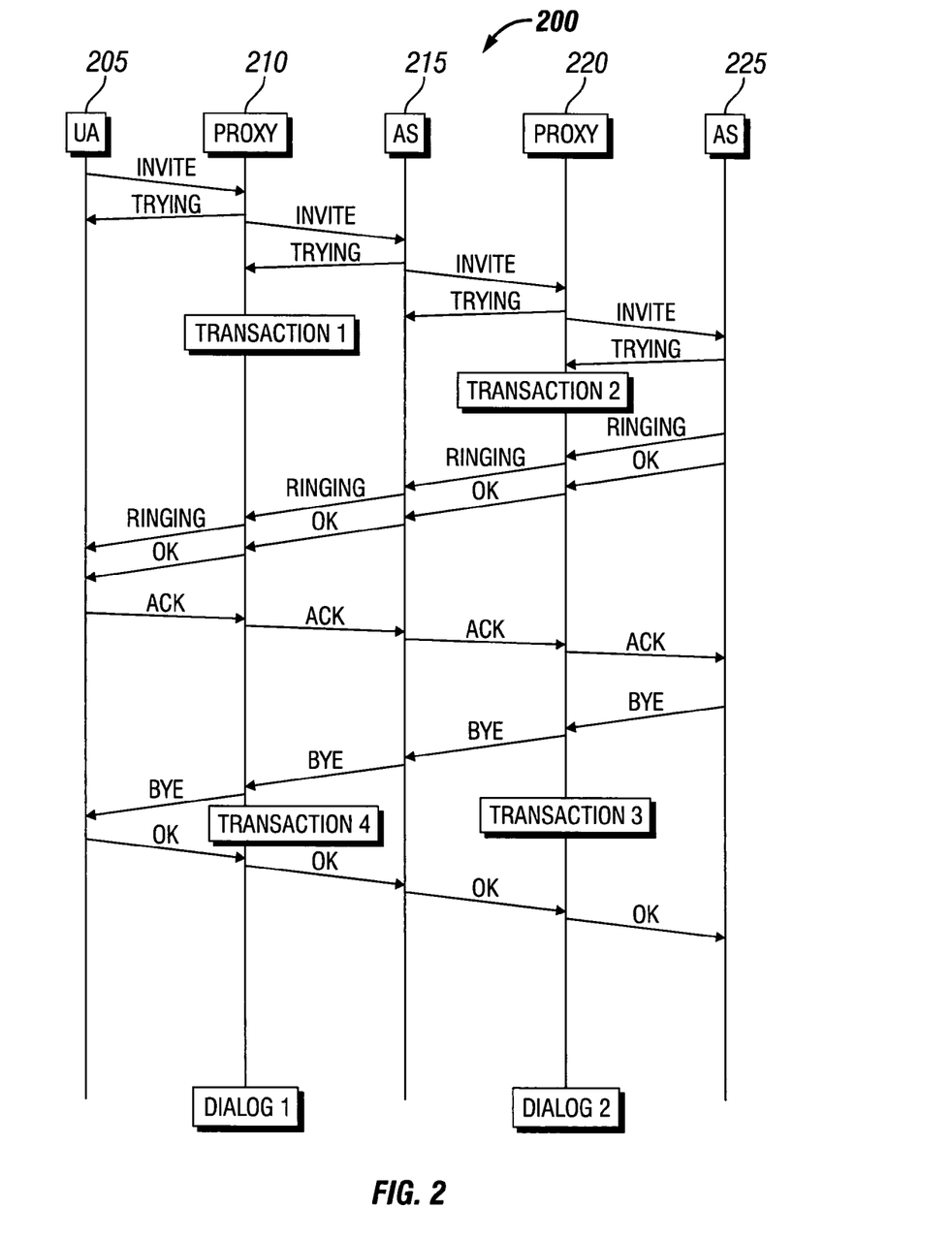
FIG. 2 is a message flow diagram illustrating an exemplary SIP signaling sequence according to the present state of the art.

FIG. 2 is a message flow diagram illustrating an exemplary SIP signaling sequence 200 according to the present state of the art. The signaling sequence is a series of control messages passing between a number of network components. Here the network components participating in the signaling sequence are a UA (user agent) 205, a first proxy server 210, a first AS 215, a second proxy server 220 and a second AS 225.

In this example, the signaling sequence relates to establishing and later terminating a connection between UA 205 and second AS 225. To establish the connection, the UA 205 first sends an INVITE request to the first proxy server 210, which forwards the request to first AS 215, setting up the dialog 1. A dialog is a communication session between two peer devices, in the case of dialog 1 between UA 205 and AS 215. (Proxy server 210 functions as a switch that forwards messages from one peer device to another, or to another proxy server on their way to the second peer device.) Similarly, first AS 215 and second AS 225 set up dialog 2 between themselves when the INVITE request is sent in a message from AS 215 to proxy server 220 and a message from proxy server 220 to AS 225.

As can be seen in FIG. 2, AS 225 returns several responses, basically in reply to the message from proxy server 220 relaying the INVITE request originating at UA 205. The first response is TRYING, which is related from AS 225 to UA 205 in a series of messages between each of the participating nodes. In this example, the TRYING response is followed by RINGING, and finally an OK response. In SIP, the OK response is a 2xx type of message (more specifically, 200—OK), which indicates a request has been successfully completed. The messages of dialog 1 and dialog 2, up to this point, are referred to, respectively, as transaction 1 and transaction 2. IN SIP, a transaction consists of a single request and any responses to that request. Note that in FIG. 2, an ACK (acknowledgement) was subsequently also sent, in a series of messages from UA 205 to AS 225. By convention, however, SIP transactions include only those messages up to a 2xx response (if one occurs, as it does in the example of FIG. 2).

In the example of FIG. 2, the communication session continues until it is terminated by a BYE message, in this case originating at AS 225 and relayed in a series of messages between participating nodes back to UA 205. The BYE messages initiate, respectively, transaction 3 between AS 225 and AS 215 (which is therefore part of dialog 2) and transaction 4 between AS 215 and UA 205 (forming a part of dialog 1). UA 205, in response, initiates its own OK message and it is similarly sent through each node to UA 225. This OK response terminates transaction 3 and transaction 4. In this example, it also terminates dialog 1 and dialog 2, and as a consequence marks the end of SIP signaling sequence 200.

Although the IMS architecture using SIP protocols has many advantages, the use of separate dialogs and transactions within a given signaling sequence poses problems for efficient fault localization and troubleshooting in the event that the communication session is not established or terminated successfully. The segmented nature of the signaling sequence is further illustrated with reference to FIG. 3.

Figure 3:
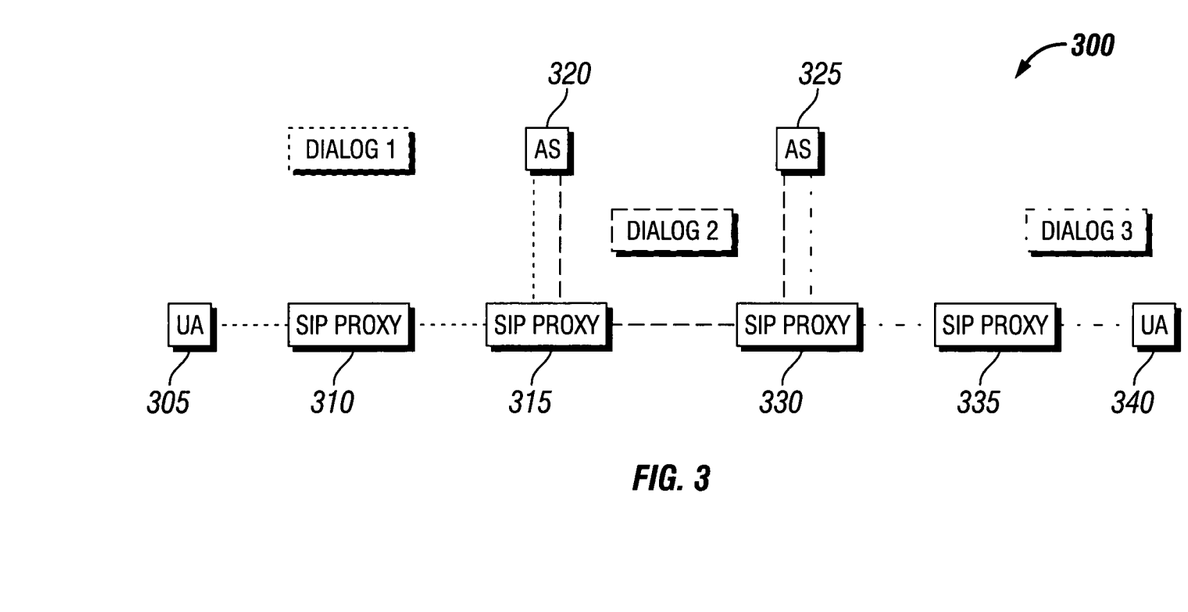
FIG. 3 is a simplified block diagram illustrating an exemplary IMS control message structure for an IMS call according to the present state of the art.

FIG. 3 is a simplified block diagram illustrating an exemplary IMS control message flow 300 for an IMS call according to the present state of the art. The configuration of the participating nodes is similar though not identical to that of the example shown in FIG. 2. In FIG. 3, UA 305 forms a dialog 1 with AS 320 via a first SIP proxy server 310 and a second SIP proxy server 315. Likewise UA 340 forms a dialog 3 with AS 325 via a third proxy server 335 and a fourth proxy server 330. Dialog 2 in this example includes the second proxy server 315 and the fourth proxy server 330 as well as the first AS 320 and the second AS 325. Note that instead of as 320 and 325, any type of UA might be substituted. First proxy server 310 and third proxy server 335 may be, for example, P-CSCFs, and second proxy server 310 and fourth proxy server 330 may be, for example S-CSCFs. Other components may also be present as well. As with the previous example, the configuration of FIG. 3 uses three separate SIP dialogs to form a communication session between the end UAs, UA 305 and UA 340. Again, this environment can make fault localization and other troubleshooting less efficient and effective than is often desirable.

SUMMARY

To address the above-discussed deficiencies of the prior art, it is a primary object of the present invention to provide a method and arrangement for enabling SIP (session initiation protocol) signaling sequence reconstruction to facilitate performance monitoring and fault localization in an IMS (IP (Internet protocol) multimedia subsystem). The monitoring tasks and timing may be specified by an entity either inside or outside of the IMS.

In one aspect, the present invention is directed to a method for enabling SIP signaling sequence reconstruction in an IMS, characterized by the step of receiving an SIP message in a first IMS node, the SIP message forming a part of a SIP signaling sequence, and the step of attaching a P-Monitoring-Request header. The P-Monitoring-Request header, in this embodiment, includes an IMS monitoring ID field populated with values identifying the SIP signaling sequence to be reconstructed, a processing node ID field populated with values representing the entities processing the SIP messages, and a requester ID field populated with values identifying a requesting entity. It may also include in some implementations a monitoring-level field for specifying a monitoring level according to predefined criteria. If present, the monitoring level may be altered during the monitoring process.

The method according to this aspect further involves transmitting the SIP message, including the P-Monitoring-Request header, to a second IMS node, where both the first IMS node and the second IMS node are participating in a first SIP dialog, and receiving in the first IMS node a response to the transmitted message from the second IMS node, wherein the response includes the P-Monitoring-Request header. When an SIP message is received in a participating node and retransmitted, the P-Monitoring-Request header is modified at least by adding a value identifying the second IMS node. As mentioned above, the values of the monitoring-level field, if present, may also be modified.

The SIP signaling sequence being monitored may, and typically will, include more than one dialog. When the values in the P-Monitoring-Request headers are logged, they can be used to reconstruct the sequence in a manner facilitating performance monitoring. The values of the P-Monitoring-Request headers may be collected at one or a number of nodes, which may be part of the IMS or external to it. Values collected may be reported together for an entire signaling sequence, or may be reported as they are received.

In another aspect, the present invention is directed to a monitoring entity for monitoring performance in an IMS network. The monitoring entity includes a monitoring request message generator for generating monitoring requests, a network interface adapted for transmitting the monitoring request to appropriate IMS nodes for instructing the to attach P-Monitoring-Request headers to messages in a signaling sequence, to collect data contained in P-Monitoring-Request headers attached to received messages, and to report the results to the monitoring entity or to another entity. The monitoring entity further includes a processor adapted for analyzing the received responses; and a reporting module for generating reports based on this analysis.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs or an operating system program. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 4 through 8, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged communication network using a two-way signaling protocol stack.

As alluded to above, the problem with current solutions is that they permit only limited or cost inefficient reconstruction of SIP signaling sequences that occur during a signaling session. The improvements of the present invention, which focus on proper utilization of a new SIP (Session Initiation Protocol) header, enable full reconstruction of the signaling sequence and provide for enhanced fault localization and troubleshooting capabilities. This solution will now be described in greater detail.

Figure 4:
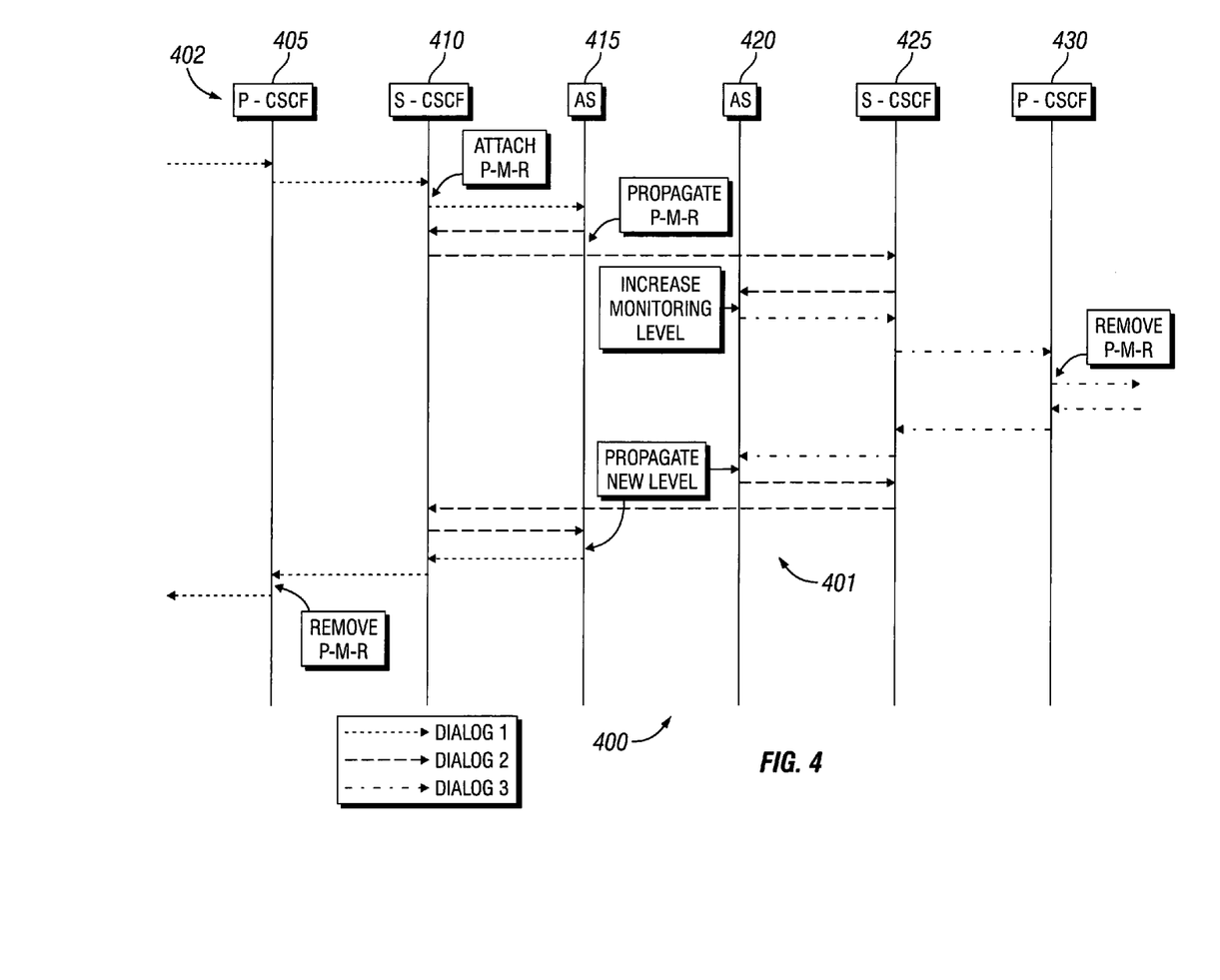
FIG. 4 is a message flow diagram illustrating selected steps in monitoring a SIP signaling sequence according to an embodiment of the present invention.

SIP signaling sequences are executed, in part, within the IMS (IP multimedia subsystem) architecture for a specific purpose such as call set up. Monitoring these sequences is often desirable for quality control and trouble shooting purposes. Monitoring adequately may be difficult, however, as SIP signaling sessions may involve a number of separate dialogs. The present invention may be implemented to advantage in such an environment, such as the one depicted in FIG. 4. FIG. 4 is a message flow diagram 400 illustrating selected steps in monitoring a SIP signaling sequence 401 according to an embodiment of the present invention. In message flow diagram 400, six nodes of IMS 402 are shown; P-CSCF 405, S-CSCF 410, AS 415, AS 420, S-CSCF 425, and P-CSCF 430. Of course, there may be many more (or in some cases less) nodes in IMS 402 in other implementations. That is, this configuration is typical but exemplary; the present invention may be applied to other configurations as well. By the same token, the steps described in relation to FIG. 4 are for purposes of illustration, many other operations may be and often are involved.

In FIG. 4, dialog 1, represented by the dotted lines, involves the entities (or 'nodes') P-CSCF (proxy call session control function) 405, S-CSCF (serving call session control function) 410, and AS (application server) 415. Note that while each of the entities shown in FIG. 4 represent hardware programmed (with software) to perform their intended function, they may in some applications reside on the same physical component and may even share certain hardware and software between them. In some cases, and entity may also be split, with parts of the hardware or software residing on different physical components. In FIG. 4, dialog 3, represented by the broken/dotted lines, involves AS 420, S-CSCF 425, and P-CSCF 430. Linking dialog 1 and dialog 3 together is dialog 2, represented by the broken line and involving the participation of both S-CSCFs 410 and 425 and both ASs 415 and 420. Note that the term 'signaling sequence' is used so that it may generally represent all of the dialogs, including each of the transactions (see FIG. 2) collectively making up those dialogs.

In the embodiment of FIG. 4, the depicted IMS 402 represents a monitoring domain, meaning that the monitoring function being executed is limited to the nodes shown. There may be other entities involved in the overall procedure, but they are not defined to be in the monitoring domain. Limiting the monitoring function may be useful, for example, to limit the number of monitoring-specific transmissions and the quantity of data involved in the monitoring process. The messages making up signaling sequence 401, of course, are those to or from the nodes in the monitoring domain related to the procedure in question.

In order to enable full signal sequence reconstruction, a new monitoring header is utilized. In the embodiment of FIG. 4, a message, for example from a UA (user agent—not shown) is received in P-CSCF 405, which may for example be an INVITE request. P-CSCF 405 then generates a corresponding message and forwards it to S-CSCF 410. In S-CSCF 410, a P-Monitoring-Request (P-M-R) header is attached to the request, and it is forwarded on to AS 415. As mentioned, these messages constitute a portion of dialog 1.

In dialog 2, AS propagates the P-Monitoring-Request header, returning it in a message to C-CSCF 410. As will be described in more detail below, with reference to FIG. 5, AS 415 also modifies the values carried by the P-Monitoring-Request header to include a self reference. S-CSCF 410 does the same before forwarding the request, including the P-Monitoring-Request header, to S-CSCF 425. Before communicating the request to AS 420, S-CSCF 425 adds an indication of its own identity.

In accordance with an aspect of the present invention, each P-Monitoring-Request header may (but is not required to) include a value indicating a certain level of monitoring. This monitoring level, if present, may be set initially when the P-Monitoring-Request header is first attached, or may be added at a later time. In the embodiment of FIG. 4, it is assumed that a monitoring level indicator is present in the P-Monitoring-Request header as received by AS 420. Upon examining the monitoring level specified in the received P-Monitoring-Request header, however, in this embodiment the AS 420 increases the monitoring level. This may be done for a variety of reasons, for example traffic conditions, operational history, or the identity of the nodes through which the P-Monitoring-Request header has already passed. In some instances, the monitoring level may be lowered as well, although this would be less usual. The modified monitoring level may also simply reflect a set value for the device AS 420, which may in impose the new value without first examining the received P-Monitoring-Request header to determine what value is already set. The monitoring-level may be modified in response to a monitoring request received from another entity.

The AS 420 then initiates dialog 3 by sending the message to S-CSCF 425, including the P-Monitoring-Request header containing the new monitoring level. The S-CSCF 425, in turn, then (adding its own identity to the P-Monitoring-Request header) transmits a message to P-CSCF 430. In the embodiment of FIG. 4, P-CSCF 430 may, for example, be communicating with another UA, or a gateway device accessing another network. This other device (not shown), however, is not part of the monitoring domain, and P-CSCF 430 removes the P-Monitoring-Request header prior to communicating with this device. This may be done, for example, for security reasons, but is not done in all embodiments. In some implementations, the security reasons may not apply, or there may be some affirmative reason to transfer the information in the P-Monitoring-Request header outside of the monitoring domain. In yet another embodiment, selective portions of the information may be removed prior to communication with the outside entity. This may be accomplished by erasing some or all of the values of the headers fields, or by removing one or more of the fields entirely, in effect altering the structure of the P-Monitoring-Request header.

Naturally, when the P-CSCF 430 communicates with nodes of IMS 402 that are within the monitoring domain, the P-Monitoring-Request header is used. This may occur, for example, when a response is received from the outside device, and dialog 3 may continue. Of course the outside device cannot add its identity to the P-Monitoring-Request header, especially if it does not receive a message including the header. The P-CSCF 430 may in some embodiments, however, add an indication of its own identity and identity of the outside device as well.

In the embodiment of FIG. 4, the AS 420 increased the monitoring level from its initial setting when the P-Monitoring-Request header was first attached by S-CSCF 410. The entities preceding it in the signaling sequence, however, have up until now not had the opportunity to discover this adjustment. The new level, however, is included in the P-Monitoring-Request header and thereby is propagated when AS 420 resumes dialog 2 and when AS 415 resumes dialog 1. When each of the subsequent IMS 402 nodes receives their respective messages including P-Monitoring-Request headers, they will become aware of the new monitoring level and adjust accordingly. Of course they will continue to supplement the values in the P-Monitoring-Request header, at least to indicate their identity. The monitoring level could, of course, be modified again, with the change being passed on to subsequent nodes in the signaling sequence. The signaling sequence eventually reaches P-CSCF 405, which may remove (that is, not include) the P-Monitoring-Request header in messages sent to the outside entity originating the request.

Figure 5:
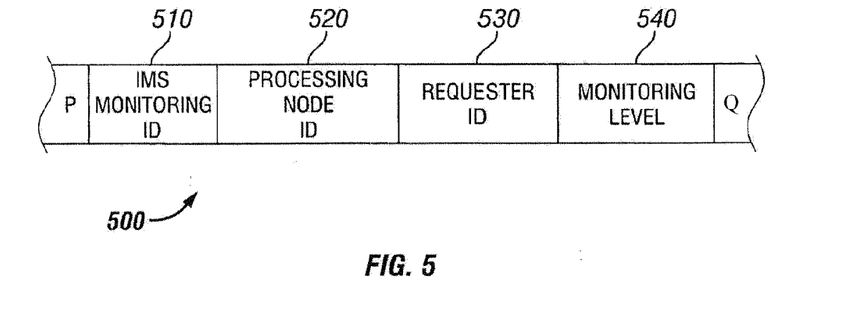
FIG. 5 is a graphic representation of the header fields associated with a P-Monitoring-Request header according to an embodiment of the present invention.

The P-Monitoring-Request header structure will now be described in greater detail. FIG. 5 is a graphic representation of the header fields associated with a P-Monitoring-Request header 500 according to an embodiment of the present invention. Note that header 500 may also in some implementations be more accurately described as a "header extension", but the distinction is not significant in the context of describing the present invention; the term "header" will for convenience be deemed herein to refer to both a header and a header extension. In accordance with this embodiment, header 500 includes four fields; IMS monitoring ID 510, processing node ID 520, requester ID 530, and a monitoring level field 540. Partially depicted fields p and q are not part of header 500, but simply illustrate that the fields of header 500 may be (but are not necessarily) immediately preceded or followed by other fields. Note also that in other embodiments, there may be additional fields present, or the four fields depicted in FIG. 5 may actually occur in a different sequence. Not all of the fields will be present in all implementations.

In the embodiment of FIG. 5, the IMS monitoring ID field 510 of header 500 identifies the SIP transaction involved, and is used to correlate the various SIP dialogs that may be collected at monitoring points. (These monitoring points may include, for example, CSCFs or ASs or similar nodes). The processing node ID field 520 includes the identities of at least some, and preferably all of the nodes involved in the processing of a particular SIP message and the related responses.

The requester ID field 530 identifies the monitoring entity that initiated the monitoring request. The node's name, for example, or IP address may be used, but the values in the requester ID field 530 together with the IMS monitoring ID field 510 preferably form a globally unique identifier. In some embodiments, the monitoring level field 540 is used to specify selected information regarding the monitoring process. For example, values in this field may be used to activate or deactivate certain monitoring functionalities, or to specify a desired level of detail (such as the log level) for the transaction in question. When used, the values in monitoring level field 540 may be altered by one or more of the nodes involved, for example to increase or decrease the selected monitoring level.

Exemplary values for insertion into the fields of header 500 are represented in the following example:

P-Monitoring Request: ims-monitoring-id=9495afxg86; requester-id=cscf1.mydomain; monitoring level=3; processing-node-id="CSCF1, AS1, AS2"

and as another example:

P-Monitoring Request: ims-monitoring-id=224678acfe; requester-id=mrfc.mydomain; monitoring level=00110001; processing-node-id="CSCF1, AS1, AS2"

Note that these examples are intended to be illustrative and not limiting.

Note that any node receiving a message, such an SIP request or response, not containing a P-Monitoring-Request may insert one. Generally speaking, any node receiving a message containing a P-monitoring-Request may use it for the corresponding open dialog when creating monitoring records. If the message is received within a dialog that has no monitoring-request flag (for example in the associated dialog context) indicating whether the monitoring information should be saved, it is preferred that the P-Monitoring-Request be propagated. The same is true of the monitoring level is increased and a new dialog is created, or an old dialog related to a newly-created dialog is continued.

Figure 6:
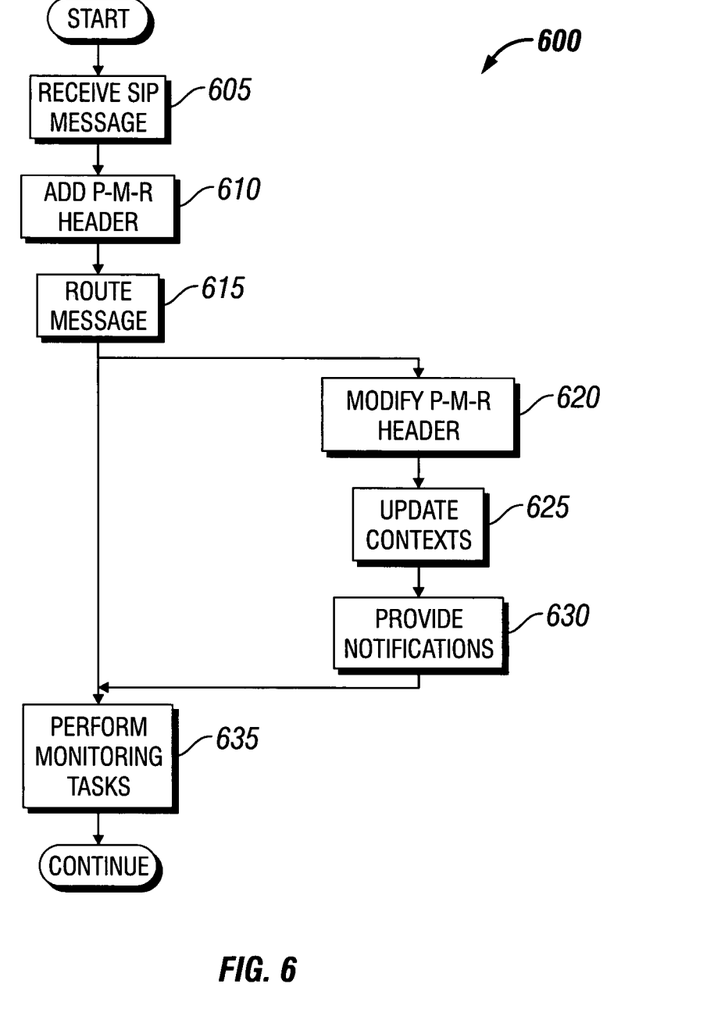
FIG. 6 is simplified flow diagram illustrating a performance monitoring method according to an embodiment of the present invention.

FIG. 6 is simplified flow diagram illustrating a performance monitoring method 600 according to an embodiment of the present invention. At START it is presumed that that hardware and software necessary to performance of the present invention is available and operational. This process then begins with receiving a message (step 605) in an IMS node operable according to the present invention. This message may be, for example, an INVITE message relating to a call set-up procedure. The message, being received, is supplemented with a P-Monitoring-Request (P-M-R) header (step 610), which is described in more detail above. Note that IMS nodes may also—and frequently will—first examine the SIP message to ascertain whether it already includes a P-Monitoring-Request header (step not shown). In this embodiment, however, the description assumes that this header has not previously been added. Note also that it assumes a motivation for adding the P-Monitoring-Request header, which will usually derive from a monitoring request message received (also not shown) from another entity. In some cases, however, the receiving node itself may initiate the monitoring procedure. In the event that neither motivation, internal or external, is present, the node simply processes the received SIP message according to standard protocols.

Returning to the embodiment of FIG. 6, the SIP message including the P-Monitoring-Request header is then routed (step 615). As should be apparent, this first includes transmission to whatever node is subsequent to the receiving node in the current dialog, or in the next dialog in the signaling sequence. This routing step 615 may involve transmission though a number of different nodes. Each of these nodes, recognizing that a P-Monitoring-Request header is present, will in most cases modify it (step 620) at least by updating the values in the processing node ID field to include values representative of the present node's identity. An update of the context of the current dialog and any other dialogs known to be in the signaling sequence may then be performed (step 625). Notifications are then transmitted (step 630) as necessary, for example to provide information to an entity requesting the monitoring, which may be external to the IMS itself. Note that in FIG. 6, steps 620 through 630 are depicted outside of the normal sequence as they represent operation that are in some cases, and at some nodes, optional.

Once the SIP message has been routed, and usually though not necessarily following the steps 620 through 630, the monitoring tasks specified in the monitoring request or by network procedure are performed (step 635). This may involve, for example, maintaining and reviewing a log of information gleaned from the P-Monitoring-Request headers of the various messages involved in the SIP signaling sequence, reconstruction of the signaling sequences, and fault localization. Since this information preferably includes values related to each node and each message involved in the signaling sequence, including each dialog and transaction, the ability to monitor IMS performance and perform fault localization analyses is greatly enhanced. The monitoring tasks may, for example, be performed at almost any node within or without the signaling sequence, or at more than one node. In some embodiments, however, a single node will be charged with collecting and analyzing the monitoring data.

Figure 7A:
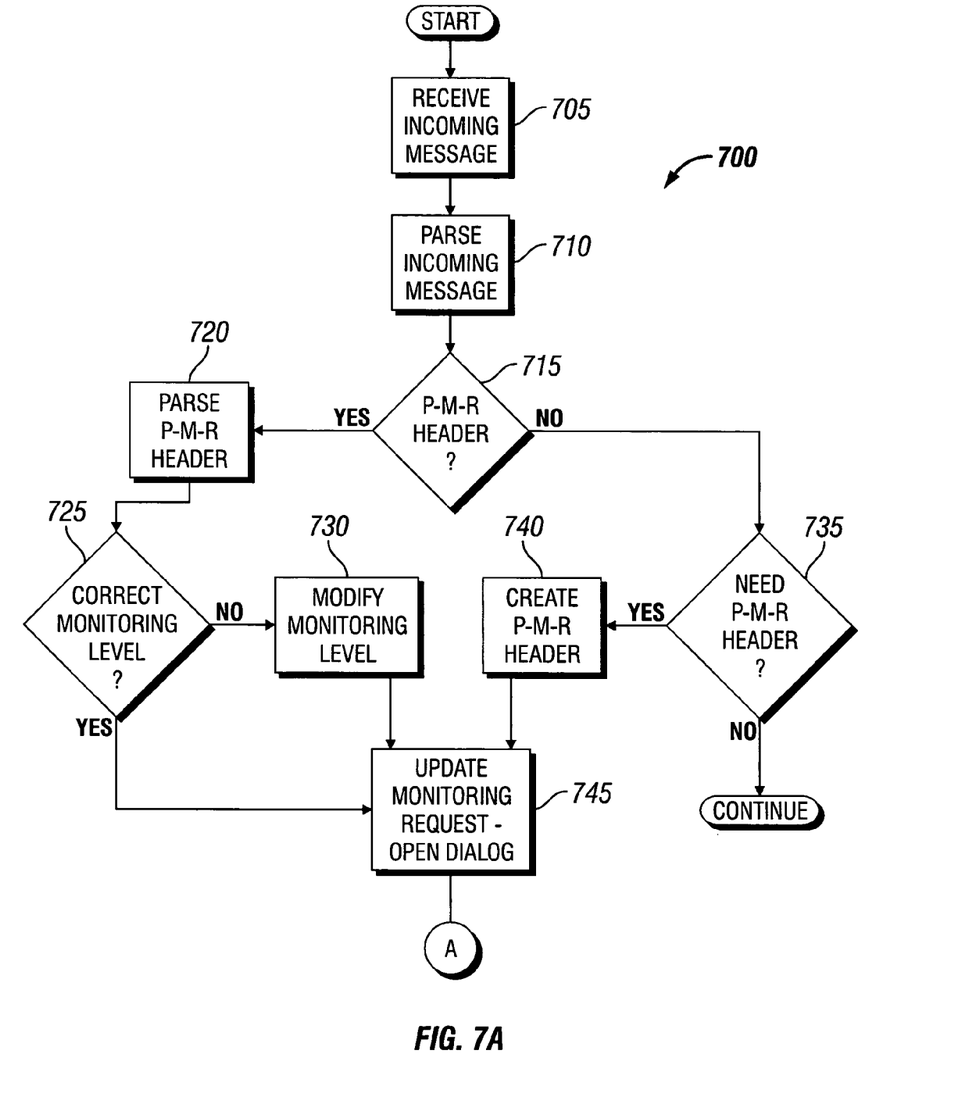
FIGS. 7a and 7b are a flow diagram illustrating a performance monitoring method according to an embodiment of the present invention.
Figure 7B:
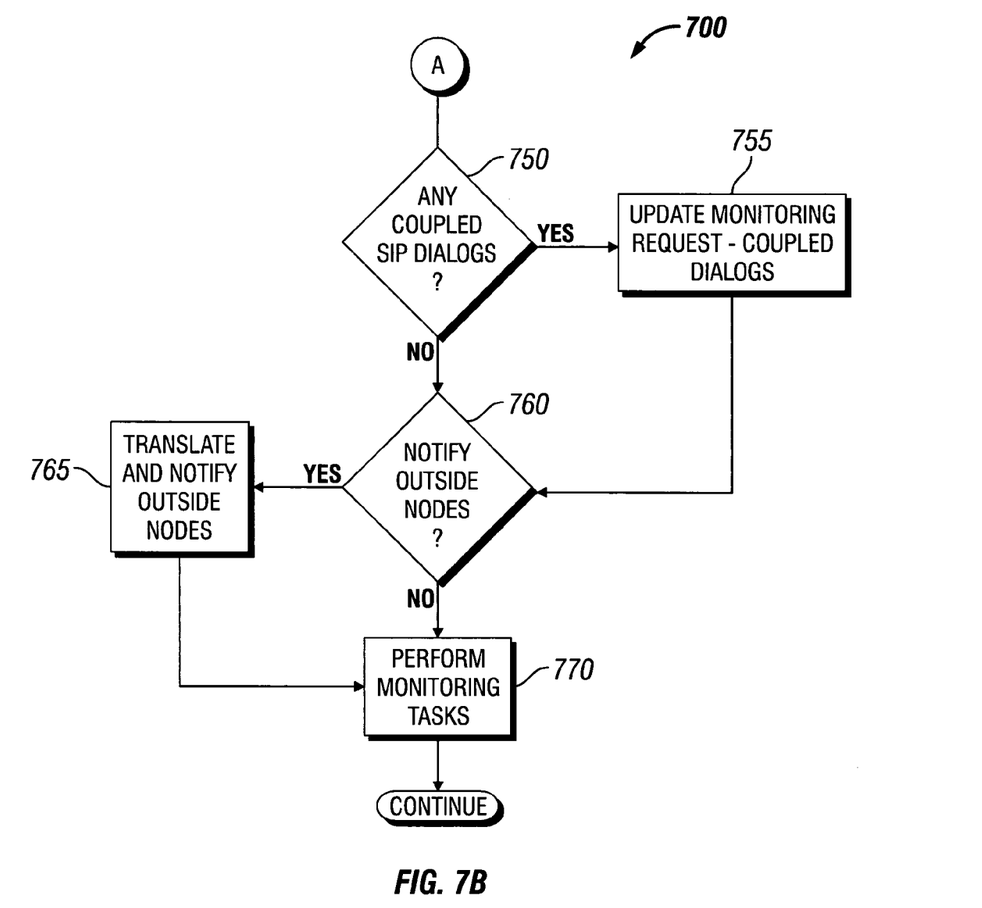

FIGS. 7a and 7b are a flow diagram illustrating a performance monitoring method 700 according to an embodiment of the present invention. (For clarity, the method 700 is represented on two sheets, continuous at tab A.) At START it is presumed that that hardware and software necessary to performance of the present invention is available and operational. The process then begins with receipt of an incoming message (step 705) at a system node. This node, unless otherwise stated, may be any node in the communication system. The received message is then parsed (step 710) to ascertain the header values, if any, relating to monitoring. A determination can then be made (step 715) as to whether the message contains a P-Monitoring-Request header. If so, the P-Monitoring-Request header is parsed (step 720), and a determination (step 725) is made as to whether the monitoring level (if any) specified in the P-Monitoring-Request header is appropriate. This determination is made according to pre-determined criteria that will vary from one implementation to another. These criteria may be set by standard, by the operator, or may be dynamic and subject to change according to traffic levels, the results of earlier monitoring efforts, or other factors. If the PMR is not at an appropriate monitoring level, then the monitoring level may be adjusted (step 730), that is, the value in the monitoring level changed, again according to the criteria in place for the system.

If, on the other hand, the determination at step 715 indicates that there is no P-Monitoring-Request header in the message, then it is determined (step 735) whether one should be associated with the message. If the determination at step 735 indicates that a P-Monitoring-Request header need not be added, then regular operations simply continue until the next message is received. If, however, it is determined that the lack of a P-Monitoring-Request header should be remedied, then a P-Monitoring-Request header is created (step 740) by appending the appropriate header fields to the message. In any case (unless there is no PMR and none is added), the process continues with updating (step 745) the monitoring request in the context associated with the dialog in which the entity in question is participating.

A determination is then made (step 750) as to whether this dialog is (as will often be the case) coupled to any other SIP dialogs. If so, the contexts associated with these other dialogs are also updated (step 755). In the embodiment of FIG. 7, at this point a determination is also made (step 760) whether any nodes outside of the IMS should be notified of the monitoring data contained in the P-Monitoring-Request header. If so, notifications are sent (step 765) to the appropriate node or nodes, after translating the data, if necessary. Any monitoring tasks indicated in the each dialog's context may then be performed (step 770). Regular communication functions then continue until another incoming message is received.

Note that the method of FIG. 7 is only one embodiment of the present invention; others will exist as well. In particular, note that the steps of method 700 may be performed in any logically-consistent order consistent with the invention, and that additional steps may be added, or in some cases omitted, without departing from the spirit of the invention.

In this manner, a full reconstruction of the SIP signaling sequences in a selected monitoring domain for an application session is enabled. The reconstruction may be based on measurements taken at a single or multiple points, and may be requested by an entity located either inside or outside of the IMS. This reconstruction of the SIP signaling sequences in turn enables enhanced fault localization and trouble shooting to be performed, often more efficiently than with current solutions. In alternate embodiments (not shown) the method 700 may also be applied outside of the SIP-IMS environment. The invention is equally applicable in other packet-switched networks employing two-way protocol-stack signaling.

Figure 8:
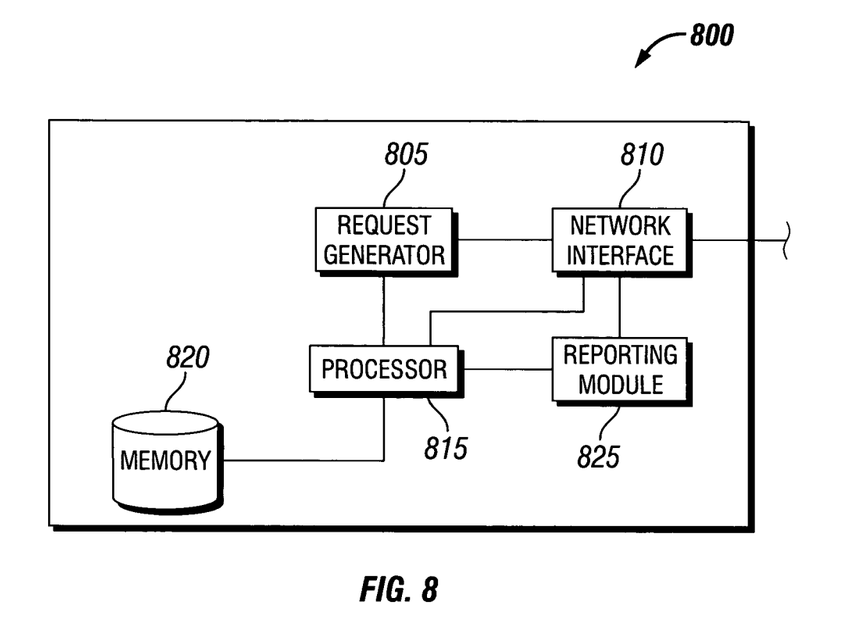
FIG. 8 is a simplified block diagram illustrating selected components of a monitoring entity arranged according to an embodiment of the present invention.

An entity for use in the performance monitoring will now be briefly described. FIG. 8 is a simplified block diagram illustrating selected components of a monitoring entity 800 arranged according to an embodiment of the present invention. IN this embodiment, monitoring entity 800 includes a monitoring request message generator 805 for generating monitoring requests. A network interface 810 is provided for transmitting the monitoring requests to appropriate nodes of the IMS. Note that the monitoring entity 800 may itself be an IMS node, for example an AS or a CSCF, and may participate in the signaling sequence to be monitored. In other cases the monitoring entity is not an IMS node of any kind.

In accordance with this embodiment of the present invention, the monitoring request generated by the request generator 805 will cause any receiving node to attach a P-Monitoring-Request header to a received SIP message (or parse one that is already present). As in the methods described above, the P-Monitoring-Request header includes an IMS monitoring ID field for values identifying an SIP signaling sequence, a processing node ID field for values representing the entities processing the SIP messages participating in the signaling sequence, and a requester ID field for values identifying a requesting entity. The monitoring request will also give reporting instructions instruct each IMS node that receives the request, which will normally be to report any information received in a P-Monitoring-Request header to the monitoring entity. Of course the instructions may also limit the necessary reporting, make reporting optional in some manner, or indicate that another entity is to receive the monitoring data reported.

In the embodiment of FIG. 8, however, it is assumed that the IMS nodes response to the monitoring entity through the network interface 810. A processor 815 is provided for performing the desired analysis. Note, however, that other nodes or entities may receive and analyze the data as well. Memory 820 is used for storing, for example, the received data and processing instructions. A reporting module 825 generates reports based on the analysis performed by process or 815 and, if desired, transmits reports to other entities via network interface 810.

Although the present invention has been described in detail, those skilled in the art should understand that they can make various changes, substitutions and alterations herein without departing from the scope of the invention in its broadest form.

The invention claimed is:

1. A method for enabling signaling sequence reconstruction in an IMS (IP (Internet protocol) multimedia subsystem), the method comprising:
   receiving a signaling message in a first IMS node, the signaling message forming a part of the signaling sequence;
   attaching a P-Monitoring-Request header to the signaling message, wherein the P-Monitoring-Request header includes an IMS monitoring ID field for values identifying the signaling sequence to be reconstructed, a processing node ID field for values representing one or more entities processing the signaling messages, and a requester ID field for values identifying a requesting entity; and
   transmitting the signaling message including the P-Monitoring-Request header to a second IMS node, wherein the first IMS node and the second IMS node are participating in a first signaling dialog.

2. The method according to claim 1, wherein the signaling sequence is an SIP (session initiation protocol) sequence, and the received signaling message is an SIP message.

3. The method according to claim 2, further comprising logging values from the P-Monitoring-Request headers of additional SIP messages received.

4. The method according to claim 3, further comprising logged values to the requesting entity.

5. The method according to claim 4, wherein the requesting entity is external to the IMS.

6. The method according to claim 2, further comprising receiving in the first IMS node at least one additional SIP message including the P-Monitoring-Request header, the at least one additional SIP message forming a part of the signaling sequence.

7. The method according to claim 2, wherein the SIP messaging sequence includes a plurality of SIP dialogs, and wherein the logged values include values representative of the plurality of dialogs.

8. The method according to claim 2, further comprising removing the P-Monitoring-Request header from an SIP message.

9. The method according to claim 1, wherein the P-Monitoring-Request header further includes a monitoring-level field.

10. The method according to claim 9, further comprising determining the monitoring level specified in the P-Monitoring-Request header.

11. The method according to claim 10, further comprising modifying the monitoring level specified in the P-Monitoring-Request header.

12. The method according to claim 1, further comprising receiving a monitoring request from the requesting entity.

13. The method according to claim 12, wherein the monitoring request specifies a monitoring level.

14. The method according to claim 1, further comprising:
   receiving in the first IMS node a response to the transmitted signaling message from the second IMS node, wherein the response includes the P-Monitoring-Request header, the P-Monitoring-Request header having been modified at least by adding a value identifying the second IMS node.

15. A monitoring entity structured to monitor performance in an IMS network that transmits control messages according to a signaling protocol, the monitoring entity comprising:
   a monitoring request message generator structured to generate a monitoring request;
   a network interface structured to transmit the monitoring request to at least one node in the IMS and to receive responses to the monitoring request; and
   a processor structured to analyze the received responses,
   wherein the monitoring request causes the at least one node to attach a P-Monitoring-Request header to a received signaling message, and
   wherein the P-Monitoring-Request header includes an IMS monitoring ID field for values identifying a signaling sequence, a processing node ID field for values representing one or more entities processing the signaling messages participating in the signaling sequence, and a requester ID field for values identifying a requesting entity.

16. The monitoring entity according to claim 15, wherein the monitoring entity is an IMS node.

17. The monitoring entity according to claim 16, wherein the monitoring entity is an application server.

18. The monitoring entity according to claim 16, wherein the monitoring entity is a call session control function node.

19. The monitoring entity according to claim 15, wherein the processor is further structured to analyze the received responses by reconstructing the signaling sequence.

20. The monitoring entity according to claim 19, further comprising a reporting module structured to generate reports based on the signaling sequence reconstruction.

21. The monitoring entity according to claim 15, wherein the monitoring message specifies a monitoring level.

22. The monitoring entity according to claim 15, wherein the monitoring entity is structured to receive responses to the monitoring request from a plurality of IMS nodes.

23. The monitoring entity according to claim 15, wherein the signaling protocol is SIP and the signaling message is an SIP message.

24. In an IMS (IP (Internet protocol) multimedia subsystem), a method performed by a current IMS node to enable reconstruction of a signaling sequence, the method comprising:
   receiving a signaling message from a previous IMS node, the signaling message forming a part of the signaling sequence;
   determining whether the signaling message includes a P-Monitoring-Request header;
   when it is determined that the signaling message does not include the P-Monitoring-Request header, determining whether the signaling sequence should be monitored;
   when it is determined that the signaling sequence should be monitored, creating the P-Monitoring-Request header to the signaling message, the P-Monitoring-Request header including an IMS monitoring ID field indicating the signaling sequence to be reconstructed, a processing node ID field indicating one or more nodes involved in processing of the signaling message and related responses including the current IMS node, and a requester ID field indicating an entity that initiated monitoring of the signaling sequence; and
   transmitting the signaling message with the created P-Monitoring-Request header to a subsequent IMS node, the current IMS node and the subsequent IMS node participating in a dialog.

25. The method according to claim 24, further comprising:
   when it is determined that the signaling message includes the P-Monitoring-Request header, modifying the P-Monitoring-Request header to include a node ID of the current IMS node into the processing node ID field; and
   transmitting the signaling message with the modified P-Monitoring-Request header to a subsequent IMS node, the current IMS node and the previous IMS node participating in one dialog of the signaling sequence, and the current IMS node and the subsequent IMS node participating in another dialog of the signaling sequence.

26. The method according to claim 25, further comprising:
   receiving a response message from the subsequent IMS node, the response message including the P-Monitoring-Request header, the processing node ID field of the P-Monitoring-Request header including a node ID of the subsequent IMS node; and
   transmitting the response message with the P-Monitoring-Request header to the previous IMS node.

27. The method according to claim 24,
   wherein the P-Monitoring-Request header further includes a monitoring-level field indicating a monitoring level of monitoring to be performed,
   wherein the method further comprises:
   when it is determined that the signaling message includes the P-Monitoring-Request header, determining whether the indicated monitoring level is appropriate;
   when it is determined that the indicated monitoring level is appropriate is not appropriate, modifying the monitoring-level field to an appropriate monitoring level; and
   transmitting the signaling message with the modified P-Monitoring-Request header to a subsequent IMS node, the current IMS node and the previous IMS node participating in one dialog of the signaling sequence, and the current IMS node and the subsequent IMS node participating in another dialog of the signaling sequence.

28. The method according to claim 27, further comprising:
   receiving a response message from the subsequent IMS node, the response message including the P-Monitoring-Request header; and
   transmitting the response message with the P-Monitoring-Request header to the previous IMS node, the monitoring level field of the P-Monitoring-Request header specifying the appropriate monitoring level.

* * * * *